US012615638B2

(12) United States Patent　　(10) Patent No.:　US 12,615,638 B2
Yoshioka et al.　　　　　　　　　(45) Date of Patent:　Apr. 28, 2026

(54) TERMINAL AND COMMUNICATION METHOD

(71) Applicant: NTT DOCOMO, INC., Tokyo (JP)

(72) Inventors: Shohei Yoshioka, Tokyo (JP); Naoya Shibaike, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 464 days.

(21) Appl. No.: 18/040,063

(22) PCT Filed: Aug. 7, 2020

(86) PCT No.: PCT/JP2020/030514
§ 371 (c)(1),
(2) Date: Jan. 31, 2023

(87) PCT Pub. No.: WO2022/030021
PCT Pub. Date: Feb. 10, 2022

(65) Prior Publication Data
US 2024/0032035 A1　　Jan. 25, 2024

(51) Int. Cl.
*H04W 72/20* 　　(2023.01)
*H04W 72/04* 　　(2023.01)
(Continued)

(52) U.S. Cl.
CPC ........... *H04W 72/20* (2023.01); *H04W 72/04* (2013.01); *H04W 72/21* (2023.01); *H04W 72/23* (2023.01)

(58) Field of Classification Search
CPC ................ H04L 1/1861; H04L 1/1864; H04L 2001/0097; H04L 5/001; H04L 1/1607;
(Continued)

(56) References Cited

U.S. PATENT DOCUMENTS

| | | | |
|---|---|---|---|
| 2013/0195066 A1* | 8/2013 | Lee | H04W 72/21 370/329 |
| 2014/0119313 A1* | 5/2014 | Yang | H04L 5/0053 370/329 |

(Continued)

FOREIGN PATENT DOCUMENTS

WO　　WO-2020153210 A1 *　7/2020

OTHER PUBLICATIONS

Office Action issued in counterpart Japanese Application No. 2022-541097, mailed Feb. 27, 2024 (6 pages).
(Continued)

*Primary Examiner* — Thomas R Cairns
(74) *Attorney, Agent, or Firm* — Osha Bergman Watanabe & Burton LLP

(57)　　　　　　ABSTRACT

A terminal is disclosed including a reception section that receives second control information from a base station in a Physical Downlink Control Channel (PDCCH) configured for a cell in a specific Physical Uplink Control Channel (PUCCH) group, the second control information indicating a channel for transmitting first control information and data to another terminal in inter-terminal communication; and a transmission section that transmits a second response signal to the base station with a PUCCH configured for a specific cell in the specific PUCCH group, the second response signal being based on a first response signal transmitted by the other terminal having received the data. In other aspects, a communication system and a communication method are also disclosed.

4 Claims, 5 Drawing Sheets

(51) Int. Cl.
  *H04W 72/21* (2023.01)
  *H04W 72/23* (2023.01)

(58) Field of Classification Search
  CPC ......................... H04L 5/0053; H04W 4/40–48;
      H04W 72/04; H04W 72/20; H04W 72/21;
      H04W 72/23–232; H04W 72/25; H04W
      76/14; H04W 92/18; H04W 72/11; H04W
      72/115; H04W 72/40
  See application file for complete search history.

(56) References Cited

U.S. PATENT DOCUMENTS

| | | | | |
|---|---|---|---|---|
| 2015/0341918 | A1* | 11/2015 | Yang ..................... | H04W 16/32 |
| | | | | 370/312 |
| 2016/0270108 | A1* | 9/2016 | Dinan ................... | H04L 5/0082 |
| 2018/0248664 | A1* | 8/2018 | Takeda ................. | H04L 5/0032 |
| 2018/0338319 | A1* | 11/2018 | Kim ...................... | H04W 72/20 |
| 2019/0306841 | A1* | 10/2019 | Huang .................. | H04L 5/0055 |
| 2020/0214006 | A1* | 7/2020 | Choi ..................... | H04L 5/0053 |
| 2023/0045750 | A1* | 2/2023 | Ko ........................ | H04L 1/1893 |

OTHER PUBLICATIONS

Huawei, HiSilicon: "Miscellaneous corrections to 38.331 for V2X", 3GPP TSG-RAN WG2 Meeting #110 electronic, R2-2005951; Online Jun. 1-12, 2020 (8 pages).

Office Action issued in Chinese Application No. 202080104147.9, mailed Jun. 21, 2024 (11 pages).

3GPP TSG RAN meeting #86; RP-192744 "5G V2X with NR sidelink" Sitges, Spain; Dec. 9-12, 2019 (53 bages).

3GPP TSG-RAN WG2 #99bis; Tdoc R2-1711494 "On the Need of Sidelink PCell and SCell" Ericsson; Prague, Czech Republic; Oct. 9-13, 2017 (3 pages).

3GPP TSG RAN WG1 #100bis; R1-2002438 "Remaining issues on resource allocation mechanism mode 1" NTT DOCOMO, Inc .; e-Meeting, Apr. 20-30, 2020 (17 pages).

International Search Report issued in International Application No. PCT/JP2020/030514, mailed Mar. 23, 2021 (3 pages).

Written Opinion issued in International Application No. PCT/JP2020/030514; Dated Mar. 23, 2021 (3 pages).

* cited by examiner 1,2a,2b

1

TERMINAL AND COMMUNICATION METHOD

TECHNICAL FIELD

The present disclosure relates to a terminal and a communication method.

BACKGROUND ART

In 5th generation mobile communication system (5G) which is a successor system to LTE-Advanced, a Device-to-Device (D2D) technique has been studied in which terminals perform direct communication with one another without via a base station, and a D2D technique for V2X has also been studied (for example, refer to Non-Patent Literature (hereinafter, referred to as "NPL" 1). In 3rd Generation Partnership Project (3GPP), D2D is referred to as a "Sidelink." Note that LTE is an abbreviation for Long Term Evolution. V2X is an abbreviation for Vehicle-to-everything. 5G may also be referred to as New Radio (NR). In addition, in the following description, the Sidelink may be expressed as "SL."

In NR Release-16 V2X, in resource allocation mode 1, the base station performs SL scheduling and transmits, in an SL scheduling PDCCH, Downlink Control Information (DCI) including an SL grant indicating an allocated PSCCH/PSSCH to a particular terminal. In addition, the terminal that has received the SL grant performs sidelink communication with another terminal using the allocated PSCCH/PSSCH, and reports, in an SL scheduling PUCCH to the base station, SL HARQ-ACK transmitted by the other terminal via a PSFCH. Note that PDCCH is an abbreviation for Physical Downlink Control Channel, and PUCCH is an abbreviation for Physical Uplink Control Channel. Also, PSCCH is an abbreviation for Physical Sidelink Control Channel, PSSCH is an abbreviation for Physical Sidelink Shared Channel, and PSFCH is an abbreviation for Physical Sidelink Feedback Channel. In addition, HARQ is an abbreviation for Hybrid Automatic Repeat Request, and ACK is an abbreviation for Acknowledgement.

CITATION LIST

Non-Patent Literature

NPL 1
RP-192744 "5G V2X with NR sidelink," Dec. 9-12, 2019

SUMMARY OF INVENTION

Technical Problem

Radio communication systems for 5G and beyond assume flexible configuration of a combination of a PDCCH, a PUCCH and an SL scheduling PDCCH/PUCCH.

It is an object of the present disclosure to clarify a carrier for which at least one of a PDCCH and a PUCCH for SL scheduling can be configured.

Solution to Problem

A terminal of the present disclosure includes: a control section that identifies at least one of a first carrier and a second carrier, the first carrier being a carrier for which a Physical Downlink Control Channel (PDCCH) for scheduling a resource for a sidelink is configured, the second carrier being a carrier for which a Physical Uplink Control Channel (PUCCH) for feeding back information relevant to the sidelink is configured; and a communication section that performs at least one of reception of the PDCCH in the first carrier and transmission of the PUCCH in the second carrier in accordance with control of the control section, in which at least one of the first carrier and the second carrier is determined from among carriers satisfying a particular rule.

A communication method of the present disclosure includes steps performed by a terminal of: identifying at least one of a first carrier and a second carrier, the first carrier being a carrier for which a Physical Downlink Control Channel (PDCCH) for scheduling a resource for a sidelink is configured, the second carrier being a carrier for which a Physical Uplink Control Channel (PUCCH) for feeding back information relevant to the sidelink is configured; and performing at least one of reception of the PDCCH in the first carrier and transmission of the PUCCH in the second carrier in accordance with control of the control section, in which at least one of the first carrier and the second carrier is determined from among carriers satisfying a particular rule.

Advantageous Effects of Invention

According to the present disclosure, it is possible to clarify a carrier for which at least one of a PDCCH and a PUCCH for SL scheduling can be configured.

DESCRIPTION OF EMBODIMENTS

Figures 1, 2:
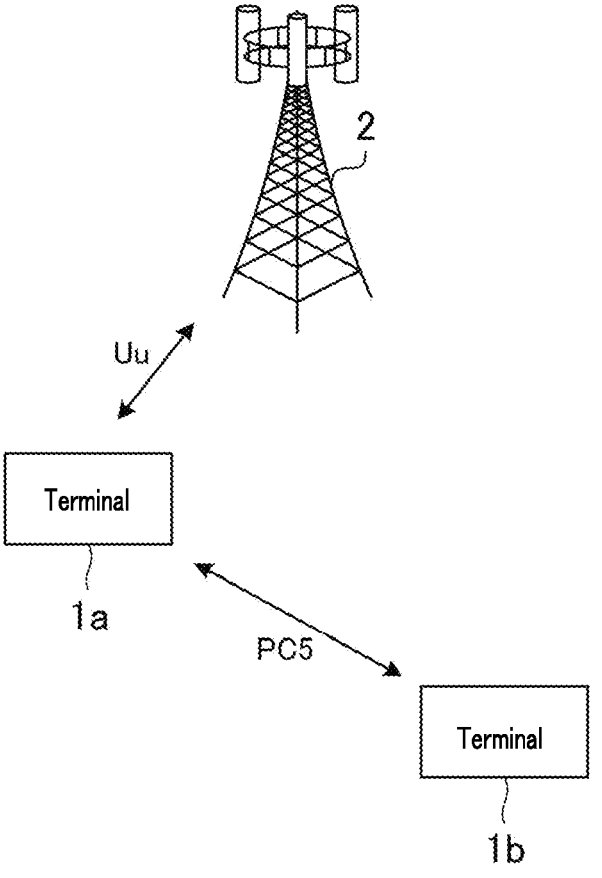
FIG. 1 illustrates an exemplary configuration of a radio communication system according to one embodiment.
FIG. 2 is a diagram illustrating a block configuration example of a terminal.

Hereinafter, an embodiment of the present disclosure will be described with reference to the accompanying drawings. Note that, in the following description, for simplicity, a PDCCH for SL scheduling is simply referred to as "PDCCH," and a PUCCH for SL scheduling is simply referred to as "PUCCH." The PUCCH for SL scheduling may mean a PUCCH for transmitting HARQ-ACK relevant to an SL transmission/reception result to a base station. In addition, the term "configure" may be replaced with "pre-configure."

In the operation of a radio communication system according to an embodiment of the present disclosure, an existing technology is used as appropriate. However, the existing technique is, for example, an existing LTE, but is not limited to the existing LTE. Also, as used herein, unless otherwise indicated, the terms "LTE" shall have a broad meaning including LTE-Advanced and schemes subsequent to LTE-Advanced (e.g., NR), or a wireless Local Area Network (LAN).

Further, in the embodiment of the present disclosure, a Duplex scheme may be a TDD schemes, a Frequency Division Duplex (FDD) scheme, or another scheme (for example, Flexible Duplex or the like).

Further, in the embodiment of the present disclosure, "to configure" radio parameters and the like may mean that a predetermined value is Pre-configured, or that a radio parameter notified by the base station or the terminal is configured.

In 3GPP, realization of V2X or enhanced V2X (eV2X) by enhancing D2D functions has been studied and specification thereof has been developed. V2X is part of Intelligent Transport Systems (ITS) and is a generic term for Vehicle to Vehicle (V2V) (meaning a communication form performed between vehicles), Vehicle to Infrastructure (V2I) (meaning a communication form performed between a vehicle and a Road-Side Unit ((RSU)), Vehicle to Network (V2N) (meaning a communication form performed between a vehicle and an ITS server), and Vehicle to Pedestrian (V2P) (meaning a communication form performed between a vehicle and a mobile terminal possessed by a pedestrian).

V2X of LTE or NR in the future which is not bound by the 3GPP specifications is expected to be studied. For example, it is envisioned that ensuring interoperability, cost-reduction by implementing a higher layer, combination or switching methods of multiple Radio Access Technologies (RAT), regulations in each country, data obtainment, distribution, method for management and usage of database on V2X platforms in LTE or NR may be studied.

In the embodiment of the present disclosure, an aspect in which a communication apparatus is mounted on a vehicle is mainly assumed, but the embodiment of the present disclosure is not limited to this aspect. For example, the communication apparatus may be a terminal held by a person, the communication apparatus may be a drone or an apparatus mounted on an airplane, or the communication apparatus may be a base station, an RSU, a relay station (relay node), a terminal having scheduling capability, or the like. Further, the present invention is not limited to V2X, and may be applied to any D2D terminal.

It should be noted that SL (Sidelink) may be distinguished from UL (Uplink) or DL (Downlink) based on any or a combination of following (1) to (4). In addition, SL may have another name.

(1) Time-domain resource mapping (2) Frequency domain resource mapping (3) Reference signal to be referred to (including a Sidelink Synchronization Signal (SLSS))

(4) Reference signal used for path loss measurement for transmit power control

In addition, with respect to Orthogonal Frequency Division Multiplexing (OFDM) in SL or UL, Cyclic-Prefix OFDM (CP-OFDM), Discrete Fourier Transform-Spread-OFDM (DFT-S-OFDM), OFDM without Transform precoding, or OFDM with Transform precoding may be applied.

It should be noted that the terminal does not have to be an apparatus with a single housing, and for example, even an apparatus with various sensors disposed distributedly in a vehicle is a terminal.

In addition, processing on transmission data in the SL by the terminal is basically the same as the processing in a UL transmission in LTE or NR. For example, a terminal scrambles a codeword of transmission data, modulates the codeword to generate complex-valued symbols, maps the complex-valued symbols (transmission signal) to one or two layers so as to perform precoding. Then, precoded complex-valued symbols are mapped to resource elements to generate a transmission signal (e.g., complex-valued time-domain SC-FDMA signal), and the transmission signal is transmitted from antenna ports.

FIG. 1 is a diagram illustrating a configuration example of the radio communication system according to an embodiment of the present disclosure. As illustrated in FIG. 1, the radio communication system includes terminals 1a and 1b and base station 2.

Terminal 1a performs communication with base station 2 via a Unique user (Uu) carrier, and performs sidelink communication with terminal 1b via an SL carrier. The Uu carrier is a carrier used for UL/DL communication. The SL carrier is a carrier used for sidelink communication. The SL carrier includes a dedicated carrier used exclusively for PC5 interface and a shared carrier used in common with the Uu interface.

Terminal 1b does not need to communicate with base station 2, and may be, for example, outside the coverage of base station 2.

In resource allocation mode 1, base station 2 performs the SL scheduling and transmits DCI including an SL grant indicating an allocated PSCCH/PSSCH to terminal 1a in a PDCCH configured for the Uu carrier. The DCI may be replaced with a higher layer parameter. Note that, the carrier for which the PDCCH is configured is determined from among carriers satisfying a predetermined rule described later, and sl-PDCCH-Config is configured for the determined carrier. The parameter "sl-PDCCH-Config" is a higher layer parameter for SL scheduling of NR from the base station, and is notified by base station 2 to terminal 1a. Terminal 1a attempts to receive SL scheduling DCI based on notified sl-PDCCH-Config. Note that, an sl-PDCCH-Config notification method is not particularly limited, and sl-PDCCH-Config may be notified by higher layer (e.g., Radio Resource Control (RRC) or Medium Access Control (MAC)) signaling, or may be notified by physical layer (PHY) signaling, for example.

Terminal 1a transmits control information and data to terminal 1b with a PSCCH/PSSCH configured for the SL carrier and allocated by base station 2.

Terminal 1b performs a demodulation/decoding process on the data received from terminal 1a, and transmits SL HARQ-ACK indicating whether or not the data has been successfully decoded to terminal 1a in a PSFCH configured for the SL carrier.

Terminal 1a reports SL HARQ-ACK received from terminal 1b to base station 2 with a PUCCH configured for the Uu carrier. In the present exemplary embodiment, SL HARQ-ACK to be reported to base station 2 may be the same information as SL HARQ-ACK received from terminal 1b, may be information determined based on SL HARQ-ACK received from terminal 1b, or may be information determined based on transmission in a PSCCH/PSSCH resource allocated by base station 2. Note that the carrier for which the PUCCH is configured is determined from among carriers satisfying a predetermined rule described later, and sl-PUCCH-Config is configured for the determined carrier. The parameter "sl-PUCCH-Config" is a higher layer parameter for reporting SL HARQ-ACK from the terminal to the base station, and is notified by base station 2 to terminal 1a. Note that, the sl-PUCCH-Config notification method is not particularly limited.

Although only two terminals 1a and 1b are illustrated in FIG. 1, three or more terminals may be present.

FIG. 2 is a diagram illustrating an exemplary configuration of terminal 1a. As illustrated in FIG. 2, terminal 1a includes communication section 11 and control section 12.

Communication section 11 performs communication with base station 2 and communication with terminal 1b under the control of control section 12.

Specifically, communication section 11 receives DCI transmitted by base station 2 in the PDCCH transmitted based on sl-PDCCH-Config. In addition, communication section 11 transmits SL HARQ-ACK to base station 2 in a PUCCH designated by sl-PUCCH-Config or in a PUCCH designated based on sl-PUCCH-Config.

Communication section 11 transmits control information and data to terminal 1b via the PSCCH/PSSCH in resources for the PSCCH/PSSCH configured or indicated in the SL carrier. Further, communication section 11 receives SL HARQ-ACK transmitted by terminal 1b via a PSFCH in any resource from among PSFCH resources configured for the SL carrier.

Control section 12 controls the entire operation of terminal 1a. In particular, control section 12 identifies, from sl-PDCCH-Config, a carrier for which the PDCCH is configured (that is, a carrier that can be transmitted by base station 2), and controls communication section 11 to receive the PDCCH on the carrier. In the present embodiment, the phrase, "the PDCCH is configured," may mean that reception of the PDCCH is configured, or may mean that a relevant parameter (e.g., sl-PDCCH-Config) is configured. In addition, control section 12 controls communication section 11 such that the carrier for which the PUCCH is configured is identified from sl-PUCCH-Config and the PUCCH is transmitted on the carrier.

Figure 3:
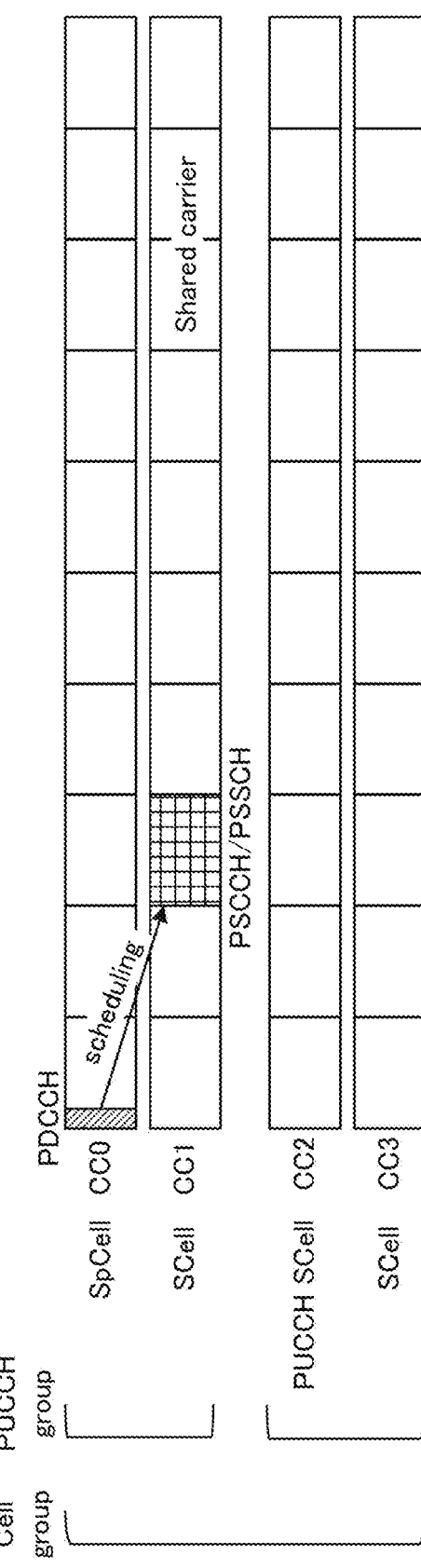
FIG. 3 is an explanatory view for explaining a carrier for which a PDCCH is configured.

An exemplary rule for determining a carrier for which a PDCCH can be configured will be described below with reference to FIG. 3. FIG. 3 is a diagram illustrating the carrier for which the PDCCH is configured. In FIG. 3, one cell group is divided into two PUCCH groups. One of the PUCCH groups includes a Special Cell (SpCell) and is provided with two carriers of CC0 and CC1, whereas the other PUCCH group includes a PUCCH Secondary Cell (SCell) and is provided with two carriers of CC2 and CC3. In this instance, CC0 is SpCell (i.e., PCell or PSCell), CC2 is PUCCH SCell, and CC1 and CC3 are SCell. Note that the "PUCCH group" means a unit of a carrier group for reception of at least one of the PDCCH and/or PDSCH and for feedback based on the reception.

In FIG. 3, it is assumed that all of CC0, CC2, and CC3 are Uu carriers, and CC1 are a Uu carrier and an SL carrier (shared carrier). Note that FIG. 3 illustrates the case where the PDCCH is transmitted in CC0, eventually.

\<Rule A1\>

Rule A1 is to allow configuration of the PDCCH for all Uu carriers. For example, the PDCCH may be configured for a Uu carrier in a PUCCH group different from that of an SL carrier, or may also be configured for a Uu carrier in the same PUCCH group as the SL carrier.

In the exemplary carrier configuration of FIG. 3, the carriers that satisfy rule A1 are Uu carriers CC0, CC1, CC2, and CC3. In the higher layer, the carrier for which the PDCCH is configured is determined from CC0, CC1, CC2, and CC3. For example, when CC0 is determined as the Uu carrier for which the PDCCH is configured, sl-PDCCH-Config is configured for CC0.

Terminal 1a receives the PDCCH in CC0 according to sl-PDCCH-Config, analyzes an SL grant included in the DCI in the PDCCH, and transmits control information and data to terminal 1b in a PSCCH/PSSCH indicated in the SL grant in CC1.

\<Rule A2\>

Rule A2 is to allow configuration of the PDCCH for all the Uu carriers in the same PUCCH group as that of the SL carrier.

In the exemplary carrier configuration of FIG. 3, the carriers satisfying rule A2 are SL carrier CC1 and Uu carriers CC0 and CC1 in the same PUCCH group. In the higher layer, the carrier for which the PDCCH is configured is determined from CC0 and CC1. For example, when CC0 is determined as the Uu carrier for which the PDCCH is configured, sl-PDCCH-Config is configured for CC0.

\<Rule A3\>

Rule A3 is to allow configuration of the PDCCH for all the Uu carriers in the PUCCH group different from that of the SL carrier.

In the exemplary carrier configuration of FIG. 3, carriers that satisfy rule A3 are Uu carriers CC2 and CC3 in the PUCCH group different from that of SL carrier CC1. In the higher layer, the carrier for which the PDCCH is configured is determined from CC2 and CC3. For example, when CC2 is determined as the Uu carrier for which the PDCCH is configured, sl-PDCCH-Config is configured for CC2.

\<Rule A4\>

Rule A4 is to allow configuration of the PDCCH for the Uu carriers of SpCell and/or PUCCH SCell.

In the exemplary carrier configuration of FIG. 3, the carriers satisfying rule A4 are Uu carrier CC0 being SpCell and/or Uu carrier CC2 being PUCCH SCell. For example, in the higher layer, CC0 is determined as the carrier for which the PDCCH is configured. Then, sl-PDCCH-Config is configured for CC0.

\<Rule A5\>

Rule A5 is to allow configuration of the PDCCH for the shared carrier.

In the exemplary carrier configuration of FIG. 3, the carrier satisfying rule A5 is shared carrier CC1. In the higher layer, the carrier for which the PDCCH is configured is determined to be CC1. Then, sl-PDCCH-Config is configured for CC1.

\<Variations\>

In the above-described embodiment, the number of carriers for which the PDCCH is configured is one, but in the present embodiment, the PDCCH may also be configured for a plurality of carriers.

Further, in the present embodiment, the rule to be applied may be changed depending on the type of SL carrier. For example, when the SL carrier is a dedicated carrier, rule A1 is applied, and when the SL carrier is a shared carrier, rule A2 is applied.

\<Effect\>

As described above, by configuring the rules for defining the conditions of the carrier for which the PDCCH can be configured, the carrier for which the PDCCH is configured can be clarified.

In addition, application of a looser rule such as rule A1 makes it possible to perform flexible scheduling. In addition, application of a stricter rule such as rule A5 makes it possible to simplify the configuration of an apparatus. Application of rules of intermediate strictness, such as rules A2, A3, and A4, makes it possible to balance between scheduling flexibility and apparatus configuration simplicity.

Figure 4:
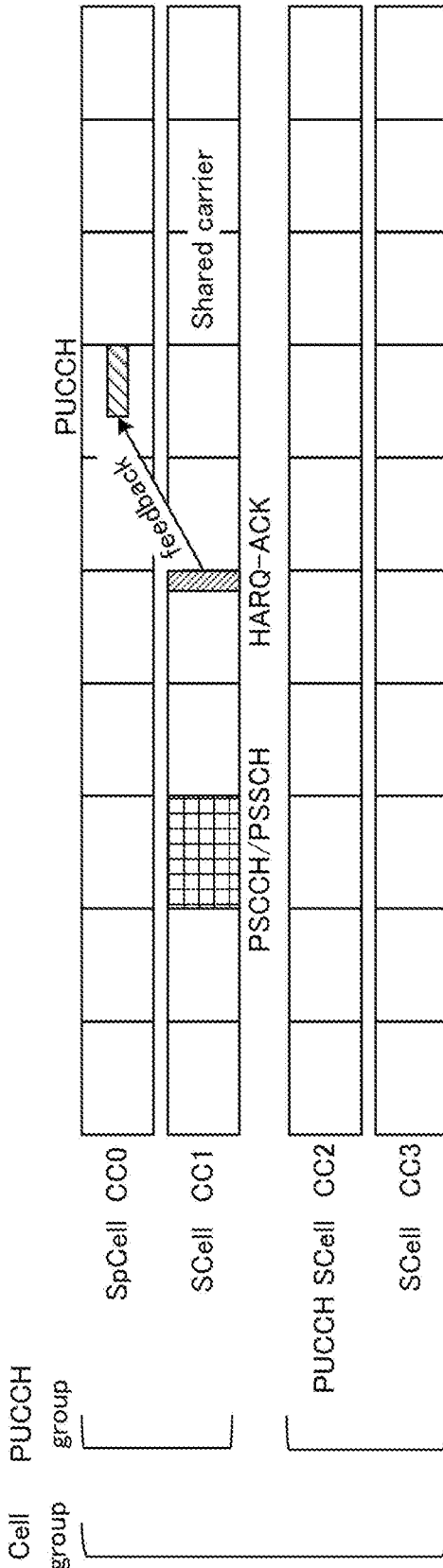
FIG. 4 is an explanatory view for explaining a carrier for which the PUCCH is configured.

Next, exemplary rules for determining a carrier for which the PUCCH can be configured will be described with reference to FIG. 4. FIG. 4 is a diagram illustrating a carrier for which the PUCCH is configured. Note that FIG. 4 illustrates an example of a cell configuration and a carrier configuration similar to those of FIG. 3.

<Rule B1>

Rule B1 is to allow configuration of the PUCCH for all Uu carriers among those carriers (for example, SpCell or PUCCH SCell) for which the PUCCH can be configured. For example, the PUCCH may be configured for a Uu carrier in a PUCCH group different from that of the SL carrier, or may be configured for a Uu carrier in the same PUCCH group as the SL carrier.

In the exemplary carrier configuration of FIG. 4, the carriers that satisfy rule B1 are Uu carriers CC0 and CC2. In the higher layer, the carrier for which the PDCCH is configured is determined from CC0 and CC2. For example, when CC0 is determined as the Uu carrier for which the PUCCH is configured, sl-PUCCH-Config is configured for CC0.

Terminal 1*a* transmits the PUCCH including HARQ-ACK to base station 2 in CC0 according to sl-PUCCH-Config.

<Rule B2>

Rule B2 is to allow configuration of the PUCCH for SpCell or PUCCH SCell in the same PUCCH group the SL carrier.

In the exemplary carrier configuration of FIG. 4, the carrier that satisfy rule B2 is Uu carrier CC0 being SpCell in the same PUCCH group as SL carrier CC1. In the higher layer, the carrier for which the PUCCH is configured is determined to be CC0. Then, sl-PUCCH-Config is configured for CC0.

<Rule B3>

Rule B3 is to allow configuration of the PUCCH for SpCell or PUCCH SCell in a PUCCH group different from that of the SL carrier.

In the exemplary carrier configuration of FIG. 4, the carrier that satisfy rule B3 is Uu carrier CC2 being PUCCH SCell in the PUCCH group different from that for SL carrier CC1. In the higher layer, the carrier for which the PUCCH is configured is determined to be CC2. Then, sl-PUCCH-Config is configured for CC2.

<Rule B4>

Rule B4 is to allow configuration of the PUCCH for a particular Uu carrier of SpCells or PUCCH SCells.

In the exemplary carrier configuration of FIG. 4, when the particular Uu carrier is SpCell, the carrier satisfying rule B4 is Uu carrier CC0 being SpCell. In the higher layer, the carrier for which the PUCCH is configured is determined to be CC0. Then, sl-PUCCH-Config is configured for CC0.

<Rule B5>

Rule B5 is to allow configuration of the PUCCH for the shared carrier.

In the exemplary carrier configuration of FIG. 4, the carrier satisfying rule B5 is shared carrier CC1. In the higher layer, the carrier for which the PUCCH is configured is determined to be CC1. Then, sl-PUCCH-Config is configured for CC1.

<Variations>

In the above-described embodiment, the number of carriers for which the PUCCH is configured is one, but in the present embodiment, the PUCCH may also be configured for a plurality of carriers.

Further, in the present embodiment, the rule to be applied may be changed depending on the type of SL carrier. For example, when the SL carrier is a dedicated carrier, rule B1 is applied, and when the SL carrier is a shared carrier, rule B2 is applied.

<Effect>

As described above, by configuring the rules for defining the conditions of the carrier for which the PUCCH can be configured, the carriers for which the PUCCH can be configured can be clarified.

In addition, application of a looser rule such as rule B1 makes it possible to perform flexible scheduling. In addition, application of a stricter rule such as rule B5 makes it possible to simplify the configuration of an apparatus. Application of rules of intermediate strictness, such as rules B2, B3, and B4, makes it possible to balance between scheduling flexibility and apparatus configuration simplicity.

Figure 5:
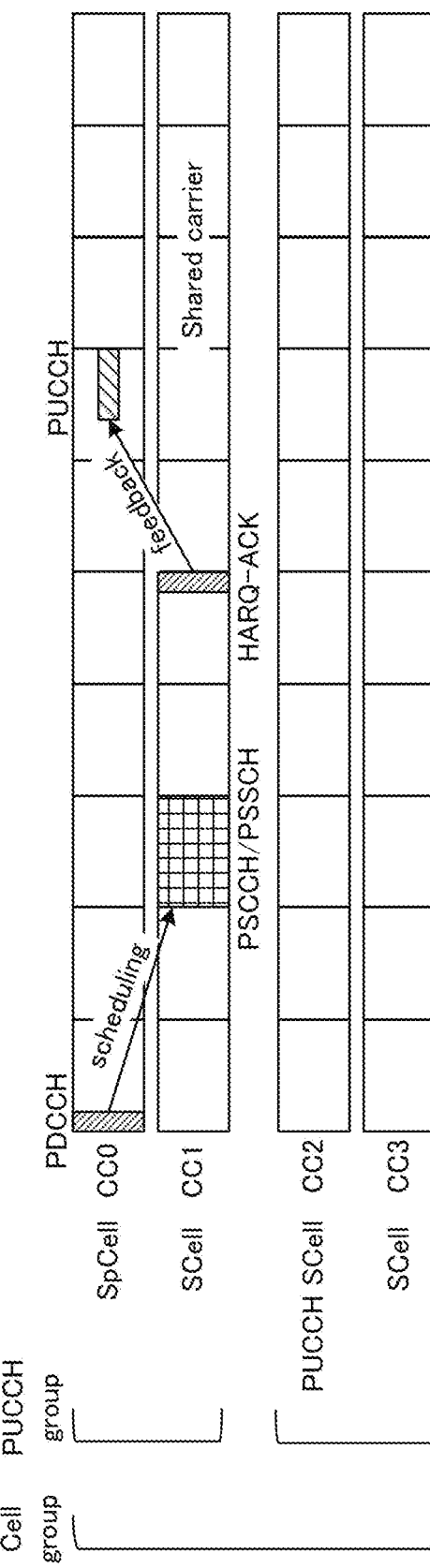
FIG. 5 is an explanatory view for explaining a carrier for which the PDCCH and PUCCH are configured.

Next, an exemplary rule for determining a relation between a carrier for which the PDCCH can be configured and a carrier for which the PUCCH can be configured will be described with reference to FIG. 5. FIG. 5 is an explanatory view for explaining a carrier for which the PDCCH and PUCCH are configured. Note that FIG. 5 illustrates an example of a cell configuration and a carrier configuration similar to those of FIG. 3.

<Rule C1>

Rule C1 is to allow configuration of the PDCCH and PUCCH independently of each other for all Uu carriers. For example, each of the PDCCH and PUCCH may be configured for a Uu carrier in a PUCCH group different from that of the SL carrier, or may be configured for a Uu carrier in the same PUCCH group.

In the exemplary carrier configuration of FIG. 5, the carriers that satisfy rule C1 are Uu carriers CC0, CC1, CC2, and CC3. In the higher layer, the Uu carrier for which each of the PDCCH and PUCCH is configured is determined from CC0, CC1, CC2, and CC3. For example, when the Uu carrier for which the PDCCH is configured is determined to be CC0, and when the Uu carrier for which the PUCCH is configured is determined to be CC2, sl-PDCCH-Config is configured for CC0 and sl-PUCCH-Config is configured for CC2.

Terminal 1*a* receives the PDCCH in CC0 according to sl-PDCCH-Config, analyzes an SL grant included in the DCI in the PDCCH, and transmits the control information and data to terminal 1*b* in the PSCCH/PSSCH indicated in the SL grant in CC1. In addition, terminal 1*a* transmits the PUCCH including HARQ-ACK to base station 2 in CC0 according to sl-PUCCH-Config.

<Rule C2>

Rule C2 is to allow configuration of the PUCCH and PDCCH for the Uu carriers in the same PUCCH group.

In the exemplary carrier configuration of FIG. 5, when the same PUCCH group is a PUCCH group including SpCell, carriers satisfying rule C2 are CC0 and CC1 for the PDCCH and Uu carrier CC0 being SpCell for the PUCCH. In the higher layer, for example, when CC1 is determined as the Uu carrier for which the PDCCH is configured, and when CC0 is determined as the Uu carrier for which the PUCCH is configured, sl-PDCCH-Config is configured for CC1, and sl-PUCCH-Config is configured for CC0.

<Rule C3>

Rule C3 is to allow configuration of the PDCCH and PUCCH for the same Uu carrier.

In the exemplary carrier configuration of FIG. 5, the carriers that satisfy rule C3 are CC0, CC1, CC2, and CC3. For example, when the PDCCH is configured for CC0 in the higher layer, the PUCCH is also configured for CC0. Then, sl-PDCCH-Config is configured for CC0 and sl-PUCCH-Config is configured for CC0.

<Rule C4>

Rule C4 is to allow configuration of the PDCCH and PUCCH for the shared carrier.

In the exemplary carrier configuration of FIG. 5, the carrier satisfying rule C4 is shared carrier CC1. In the higher layer, the shared carrier for which the PDCCH and PUCCH are configured is determined to be CC1. Then, sl-PDCCH-Config is configured for CC1 and sl-PUCCH-Config is configured for CC1. However, not CC0 but CC1 is SpCell in this case.

<Variations>

In the above-described embodiment, the number of carriers for which each of the PDCCH and PUCCH is configured is one, but in the present embodiment, each of the PDCCH and PUCCH may also be configured for a plurality of carriers.

Further, in the present embodiment, the rule to be applied may be changed depending on the type of SL carrier. For example, when the SL carrier is a dedicated carrier, rule C3 is applied, and when the SL carrier is a shared carrier, rule C4 is applied.

<Effect>

As described above, by configuring the rules for defining the conditions of the carriers for which the PDCCH and PUCCH can be configured, the carriers for which the PDCCH and PUCCH are configured can be clarified.

In addition, application of a looser rule such as rule C1 makes it possible to perform flexible scheduling. In addition, application of a stricter rule such as rule C5 makes it possible to simplify the configuration of an apparatus. Application of rules of intermediate strictness, such as rules C2, C3, and C4, makes it possible to balance between scheduling flexibility and apparatus configuration simplicity.

The present disclosure has been described above. Note that the PUCCH groups of the present embodiment can be replaced with cell groups, bands, and frequency-ranges. In addition, sl-PDCCH-Config may be replaced by sl-V2X-PDCCH-Config and may be a parameter for SL scheduling of LTE from the base station.

Further, a name other than sl-PDCCH-Config may be used for a parameter for configuring the PDCCH. Similarly, a name other than sl-PUCCH-Config may be used for a parameter for configuring the PUCCH.

(Hardware Configuration)

Note that, the block diagrams used to describe the above embodiment illustrate blocks on a function-by-function basis. These functional blocks (component sections) are implemented by any combination of at least hardware or software. A method for implementing the functional blocks is not particularly limited. That is, the functional blocks may be implemented using one physically or logically coupled apparatus. Two or more physically or logically separate apparatuses may be directly or indirectly connected (for example, via wires or by radio), and the plurality of apparatuses may be used to implement the functional blocks. The functional blocks may be implemented by combining software with the one apparatus or the plurality of apparatuses described above.

The functions include, but not limited to, judging, deciding, determining, computing, calculating, processing, deriving, investigating, searching, confirming, receiving, transmitting, outputting, accessing, solving, selecting, choosing, establishing, comparing, supposing, expecting, regarding, broadcasting, notifying, communicating, forwarding, configuring, reconfiguring, allocating, mapping, assigning, and the like. For example, a functional block (component section) that functions to achieve transmission is referred to as "transmitting unit," "transmission section," or "transmitter." The methods for implementing the functions are not limited specifically as described above.

Figure 6:
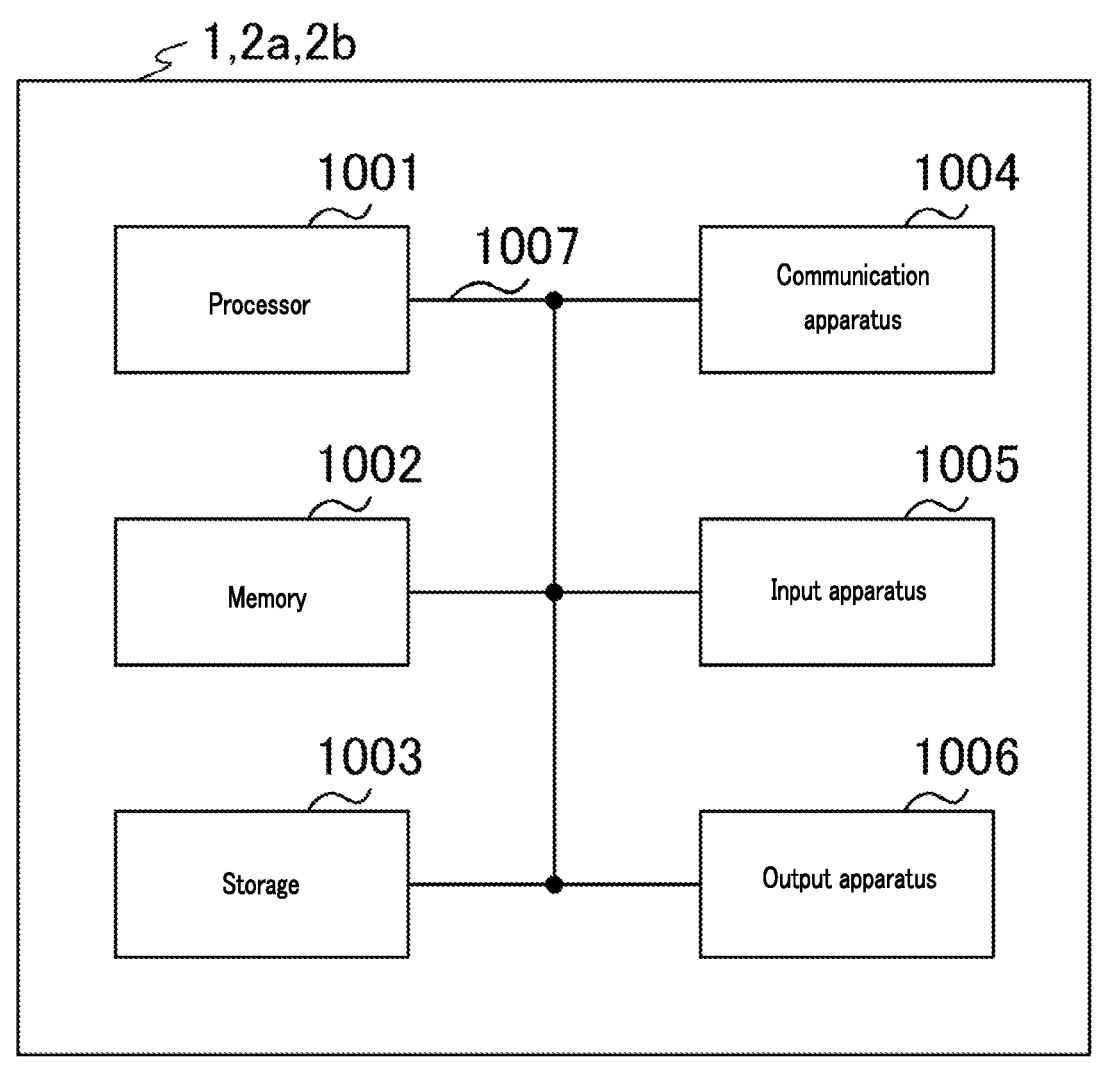
FIG. 6 illustrates an exemplary hardware configuration of the terminal and a base station according to an embodiment of the present disclosure.

For example, the base station, terminal, and the like according to an embodiment of the present disclosure may function as a computer that executes processing of a radio communication method of the present disclosure. FIG. 6 illustrates an exemplary hardware configuration of the terminal and a base station according to an embodiment of the present disclosure. Physically, terminals 1*a* and 1*b* and base station 2 as described above may be a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configuration of terminals 1*a* and 1*b* and base station 2 may include one apparatus or a plurality of apparatuses illustrated in FIG. 2 or may not include part of the apparatuses.

The functions of terminals 1*a* and 1*b* and base station 2 are implemented using predetermined software (program) loaded into hardware, such as processor 1001, memory 1002, and the like, according to which processor 1001 performs the arithmetic and controls communication performed by communication apparatus 1004 or at least one of reading and writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and the like. For example, control section 12 and/or the like as described above may be implemented by processor 1001.

Processor 1001 reads a program (program code), a software module, data, and the like from at least one of storage 1003 and communication apparatus 1004 to memory 1002 and performs various types of processing according to the program (program code), the software module, the data, and the like. As the program, a program for causing the computer to perform at least a part of the operation described in the above embodiments is used. For example, control section 12 of terminal 1a, the control section of terminal 1b, and control section 22 of the base station may be implemented using a control program stored in memory 1002 and operated by processor 1001, and the other functional blocks may also be implemented in the same way. While it has been described that the various types of processing as described above are performed by one processor 1001, the various types of processing may be performed by two or more processors 1001 at the same time or in succession. Processor 1001 may be implemented using one or more chips. Note that the program may be transmitted from a network through a telecommunication line.

Memory 1002 is a computer-readable recording medium and may be composed of, for example, at least one of a Read Only Memory (ROM), an Erasable Programmable ROM (EPROM), an Electrically Erasable Programmable ROM (EEPROM), and a Random Access Memory (RAM). Memory 1002 may be called as a register, a cache, a main memory (main storage apparatus), or the like. Memory 1002 can save a program (program code), a software module, and the like that can be executed to carry out the radio communication method according to an embodiment of the present disclosure.

Storage 1003 is a computer-readable recording medium and may be composed of, for example, at least one of an optical disk such as a Compact Disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. Storage 1003 may also be called as an auxiliary storage apparatus. The storage medium as described above may be, for example, a database, a server, or other appropriate media including at least one of memory 1002 and storage 1003.

Communication apparatus 1004 is hardware (transmission and reception device) for communication between computers through at least one of wired and radio networks and is also called as, for example, a network device, a network controller, a network card, or a communication module. Communication apparatus 1004 may be configured to include a high frequency switch, a duplexer, a filter, a frequency synthesizer, and the like in order to achieve at least one of Frequency Division Duplex (FDD) and Time Division Duplex (TDD), for example. For example, communication section 11 and the like as described above may be implemented using communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which makes outputs to the outside. Note that input apparatus 1005 and output apparatus 1006 may be integrated (for example, a touch panel).

The apparatuses, such as processor 1001, memory 1002, and the like are connected by bus 1007 for communication of information. Bus 1007 may be configured using a single bus or using buses different between each pair of the apparatuses.

Furthermore, terminals 1a and 1b and base station 2 may include hardware, such as a microprocessor, a digital signal processor (DSP), an Application Specific Integrated Circuit (ASIC), a Programmable Logic Device (PLD), and a Field Programmable Gate Array (FPGA), and the hardware may implement part or all of the functional blocks. For example, processor 1001 may be implemented using at least one of these pieces of hardware.

(Notification of Information and Signaling)

The notification of information is not limited to the aspects or embodiments described in the present disclosure, and the information may be notified by another method. For example, the notification of information may be carried out by one or a combination of physical layer signaling (for example, Downlink Control Information (DCI) and Uplink Control Information (UCI)), upper layer signaling (for example, Radio Resource Control (RRC) signaling, Medium Access Control (MAC) signaling, notification information (Master Information Block (MIB), and System Information Block (SIB))), and other signals. The RRC signaling may be called an RRC message and may be, for example, an RRC connection setup message, an RRC connection reconfiguration message, or the like.

(Applied System)

The aspects and embodiments described in the present disclosure may be applied to at least one of a system using Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or other appropriate systems and a next-generation system extended based on the above systems. Additionally or alternatively, a combination of two or more of the systems (e.g., a combination of at least LTE or LTE-A and 5G) may be applied.

(Processing Procedure and the like)

The orders of the processing procedures, the sequences, the flowcharts, and the like of the aspects and embodiments described in the present disclosure may be changed as long as there is no contradiction. For example, elements of various steps are presented in exemplary orders in the methods described in the present disclosure, and the methods are not limited to the presented specific orders.

(Operation of Base Station)

Specific operations which are described in the present disclosure as being performed by the base station may sometimes be performed by an upper node depending on the situation. Various operations performed for communication with a terminal in a network constituted by one network node or a plurality of network nodes including a base station can be obviously performed by at least one of the base station and a network node other than the base station (examples include, but not limited to, Mobility Management Entity (MME) or Serving Gateway (S-GW)). Although there is one network node in addition to the base station in the case illustrated above, a plurality of other network nodes may be combined (for example, MME and S-GW).

(Direction of Input and Output)

The information or the like (see the item of "Information and Signals") can be output from a higher layer (or a lower layer) to a lower layer (or a higher layer). The information, the signals, and the like may be input and output through a plurality of network nodes.

(Handling of Input and Output Information and the like)

The input and output information and the like may be saved in a specific place (for example, memory) or may be managed using a management table. The input and output information and the like can be overwritten, updated, or additionally written. The output information and the like may be deleted. The input information and the like may be transmitted to another apparatus.

(Determination Method)

The determination may be made based on a value expressed by one bit (0 or 1), based on a Boolean value (true or false), or based on comparison with a numerical value (for example, comparison with a predetermined value).

(Software)

Regardless of whether the software is called as software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, the information, and the like may be transmitted and received through a transmission medium. For example, when the software is transmitted from a website, a server, or another remote source by using at least one of a wired technique (e.g., a coaxial cable, an optical fiber cable, a twisted pair, and a digital subscriber line (DSL)) and a radio technique (e.g., an infrared ray and a microwave), the at least one of the wired technique and the radio technique is included in the definition of the transmission medium.

(Information and Signals)

The information, the signals, and the like described in the present disclosure may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present disclosure and the terms necessary to understand the present disclosure may be replaced with terms with the same or similar meaning. For example, at least one of the channel and the symbol may be a signal (signaling). The signal may be a message. The component carrier (CC) may be called a carrier frequency, a cell, a frequency carrier, or the like.

("System" and "Network")

The terms "system" and "network" used in the present disclosure can be interchangeably used.

(Names of Parameters and Channels)

The information, the parameters, and the like described in the present disclosure may be expressed using absolute values, using values relative to predetermined values, or using other corresponding information. For example, radio resources may be indicated by indices.

The names used for the parameters are not limitative in any respect. Furthermore, the numerical formulas and the like using the parameters may be different from the ones explicitly disclosed in the present disclosure. Various channels (for example, PUCCH and PDCCH) and information elements, can be identified by any suitable names, and various names assigned to these various channels and information elements are not limitative in any respect.

(Base Station (Radio Base Station))

The terms "Base Station (BS)," "radio base station," "fixed station," "NodeB," "eNodeB (eNB)," "gNodeB (gNB)," "access point," "transmission point," "reception point, "transmission/reception point," "cell," "sector," "cell group," "carrier," "component carrier," and the like may be used interchangeably in the present disclosure. The base station may be called a macro cell, a small cell, a femtocell, or a pico cell.

The base station can accommodate one cell or a plurality of (for example, three) cells. When the base station accommodates a plurality of cells, the entire coverage area of the base station can be divided into a plurality of smaller areas, and each of the smaller areas can provide a communication service based on a base station subsystem (for example, small base station for indoor remote radio head (RRH)). The term "cell" or "sector" denotes part or all of the coverage area of at least one of the base station and the base station subsystem that perform the communication service in the coverage.

(Terminal)

The terms "Mobile Station (MS)," "user terminal," "User Equipment (UE)," and "terminal" may be used interchangeably in the present disclosure.

The mobile station may be called, by those skilled in the art, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user agent, a mobile client, a client, or by some other appropriate terms.

(Base Station/Mobile Station)

At least one of the base station and the mobile station may be called a transmission apparatus, a reception apparatus, a communication apparatus, or the like. Note that, at least one of the base station and the mobile station may be a device mounted in a mobile entity, the mobile entity itself, or the like. The mobile entity may be a vehicle (e.g., an automobile or an airplane), an unmanned mobile entity (e.g., a drone or an autonomous vehicle), or a robot (a manned-type or unmanned-type robot). Note that, at least one of the base station and the mobile station also includes an apparatus that does not necessarily move during communication operation. For example, at least one of the base station and the mobile station may be Internet-of-Things (IoT) equipment such as a sensor.

The base station in the present disclosure may also be replaced with the user terminal. For example, the aspects and the embodiments of the present disclosure may find application in a configuration that results from replacing communication between the base station and the user terminal with communication between multiple user terminals (such communication may, e.g., be referred to as device-to-device (D2D), vehicle-to-everything (V2X), or the like). In this case, the terminal may be configured to have the functions that the base station described above has. The wordings "uplink" and "downlink" may be replaced with a corresponding wording for inter-equipment communication (for example, "side"). For example, an uplink channel, a downlink channel, and the like may be replaced with a side channel.

Similarly, the terminal in the present disclosure may be replaced with the base station. In this case, the base station is configured to have the functions that the terminal described above has.

(Meaning and Interpretation of Terms)

As used herein, the term "determining" may encompass a wide variety of actions. For example, "determining" may be regarded as judging, calculating, computing, processing, deriving, investigating, looking up, searching (or, search or inquiry)(e.g., looking up in a table, a database or another data structure), ascertaining and the like. Furthermore, "determining" may be regarded as receiving (for example, receiving information), transmitting (for example, transmitting information), inputting, outputting, accessing (for example, accessing data in a memory) and the like. Also, "determining" may be regarded as resolving, selecting, choosing, establishing, comparing and the like. That is, "determining" may be regarded as a certain type of action related to determining. Also, "determining" may be replaced with "assuming," "expecting," "considering," and the like.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. For example, "connected" may be replaced with "accessed." When the terms are used in the present disclosure, two elements can be considered to be "connected" or "coupled" to each other using at least one of one or more electrical wires, cables, and printed electrical connections or using electromagnetic energy with a wavelength of a radio frequency domain, a microwave domain, an optical (both visible and invisible) domain, or the like hat are non-limiting and non-inclusive examples.

The reference signal can also be abbreviated as an RS and may also be called as a pilot depending on the applied standard.

The description "based on" used in the present disclosure does not mean "based only on," unless otherwise specified. In other words, the description "based on" means both of "based only on" and "based at least on."

Any reference to elements by using the terms "first," "second," and the like does not generally limit the quantities of or the order of these elements. The terms can be used as a convenient method of distinguishing between two or more elements in the present disclosure. Therefore, reference to first and second elements does not mean that only two elements can be employed, or that the first element has to precede the second element somehow.

The "section" in the configuration of each apparatus may be replaced with "means," "circuit," "device," or the like.

In a case where terms "include," "including," and their modifications are used in the present disclosure, these terms are intended to be inclusive like the term "comprising." Further, the term "or" used in the present disclosure is not intended to be an exclusive or.

The radio frame may be constituted by one frame or a plurality of frames in the time domain. The one frame or each of the plurality of frames may be called a subframe in the time domain. The subframe may be further constituted by one slot or a plurality of slots in the time domain. The subframe may have a fixed time length (e.g., 1 ms) independent of numerology.

The numerology may be a communication parameter that is applied to at least one of transmission and reception of a certain signal or channel. The numerology, for example, indicates at least one of SubCarrier Spacing (SCS), a bandwidth, a symbol length, a cyclic prefix length, Transmission Time Interval (TTI), the number of symbols per TTI, a radio frame configuration, specific filtering processing that is performed by a transmission and reception apparatus in the frequency domain, specific windowing processing that is performed by the transmission and reception apparatus in the time domain, and the like.

The slot may be constituted by one symbol or a plurality of symbols (e.g., Orthogonal Frequency Division Multiplexing (OFDM)) symbol, Single Carrier-Frequency Division Multiple Access (SC-FDMA) symbol, or the like) in the time domain. The slot may also be a time unit based on the numerology.

The slot may include a plurality of mini-slots. Each of the mini-slots may be constituted by one or more symbols in the time domain. Furthermore, the mini-slot may be referred to as a subslot. The mini-slot may be constituted by a smaller number of symbols than the slot. A PDSCH (or a PUSCH) that is transmitted in the time unit that is greater than the mini-slot may be referred to as a PDSCH (or a PUSCH) mapping type A. The PDSCH (or the PUSCH) that is transmitted using the mini-slot may be referred to as a PDSCH (or PUSCH) mapping type B.

The radio frame, the subframe, the slot, the mini slot, and the symbol indicate time units in transmitting signals. The radio frame, the subframe, the slot, the mini slot, and the symbol may be called by other corresponding names.

For example, one subframe, a plurality of continuous subframes, one slot, or one mini-slot may be called a Transmission Time Interval (TTI). That is, at least one of the subframe and the TTI may be a subframe (1 ms) in the existing LTE, a duration (for example, 1 to 13 symbols) that is shorter than 1 ms, or a duration that is longer than 1 ms.

Note that, a unit that represents the TTI may be referred to as a slot, a mini-slot, or the like instead of a subframe.

Here, the TTI, for example, refers to a minimum time unit for scheduling in radio communication. For example, in an LTE system, the base station performs scheduling for allocating a radio resource (a frequency bandwidth, a transmit power, and the like that are used in each user terminal) on a TTI-by-TTI basis to each user terminal. Note that, the definition of TTI is not limited to this.

The TTI may be a time unit for transmitting a channel-coded data packet (a transport block), a code block, or a codeword, or may be a unit for processing such as scheduling and link adaptation. Note that, when the TTI is assigned, a time section (for example, the number of symbols) to which the transport block, the code block, the codeword, or the like is actually mapped may be shorter than the TTI.

Note that, in a case where one slot or one mini-slot is referred to as the TTI, one or more TTIs (that is, one or more slots, or one or more mini-slots) may be a minimum time unit for the scheduling. Furthermore, the number of slots (the number of mini-slots) that make up the minimum time unit for the scheduling may be controlled.

A TTI that has a time length of 1 ms may be referred to as a usual TTI (a TTI in LTE Rel. 8 to LTE Rel. 12), a normal TTI, a long TTI, a usual subframe, a normal subframe, a long subframe, a slot, or the like. A TTI that is shorter than the usual TTI may be referred to as a shortened TTI, a short TTI, a partial TTI (or a fractional TTI), a shortened subframe, a short subframe, a mini-slot, a subslot, a slot, or the like.

Note that the long TTI (for example, the usual TTI, the subframe, or the like) may be replaced with the TTI that has a time length which exceeds 1 ms, and the short TTI (for example, the shortened TTI or the like) may be replaced with a TTI that has a TTI length which is less than a TTI length of the long TTI and is equal to or longer than 1 ms.

A resource block (RB) is a resource allocation unit in the time domain and the frequency domain, and may include one or more contiguous subcarriers in the frequency domain. The number of subcarriers that are included in the RB may be identical regardless of the numerology, and may be 12, for example. The number of subcarriers that are included in the RB may be determined based on the numerology.

In addition, the RB may include one symbol or a plurality of symbols in the time domain, and may have a length of one slot, one mini slot, one subframe, or one TTI. One TTI and one subframe may be constituted by one resource block or a plurality of resource blocks.

Note that one or more RBs may be referred to as a Physical Resource Block (PRB), a Sub-Carrier Group (SCG), a Resource Element Group (REG), a PRB pair, an RB pair, or the like.

In addition, the resource block may be constituted by one or more Resource Elements (REs). For example, one RE may be a radio resource region that is one subcarrier and one symbol.

A bandwidth part (BWP) (which may be referred to as a partial bandwidth or the like) may represent a subset of contiguous common resource blocks (RB) for certain numerology in a certain carrier. Here, the common RBs may be identified by RB indices that use a common reference point of the carrier as a reference. The PRB may be defined by a certain BWP and may be numbered within the BWP.

The BWP may include a UL BWP and a DL BWP. An UE may be configured with one or more BWPs within one carrier.

At least one of the configured BWPs may be active, and the UE does not have to assume transmission/reception of a predetermined signal or channel outside the active BWP. Note that, "cell," "carrier," and the like in the present disclosure may be replaced with "BWP."

Structures of the radio frame, the subframe, the slot, the mini-slot, the symbol, and the like are described merely as examples. For example, the configuration such as the number of subframes that are included in the radio frame, the number of slots per subframe or radio frame, the number of mini-slots that are included within the slot, the numbers of symbols and RBs that are included in the slot or the mini-slot, the number of subcarriers that are included in the RB, the number of symbols within the TTI, the symbol length, the Cyclic Prefix (CP) length, and the like can be changed in various ways.

In a case where articles, such as "a," "an," and "the" in English, for example, are added in the present disclosure by translation, nouns following these articles may have the same meaning as used in the plural.

In the present disclosure, the expression "A and B are different" may mean that "A and B are different from each other." Note that, the expression may also mean that "A and B are different from C." The expressions "separated" and "coupled" may also be interpreted in the same manner as the expression "A and B are different."

(Variations and the like of Aspects)

The aspects and embodiments described in the present disclosure may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present disclosure has been described in detail, it is obvious to those skilled in the art that the present disclosure is not limited to the embodiments described in the present disclosure. Modifications and variations of the aspects of the present disclosure can be made without departing from the spirit and the scope of the present disclosure defined by the description of the appended claims. Therefore, the description of the present disclosure is intended for exemplary description and does not limit the present disclosure in any sense.

INDUSTRIAL APPLICABILITY

One aspect of the present disclosure is useful for radio communication systems.

REFERENCE SIGNS LIST 1a,1b Terminal
2 Base station
11 Communication section
12 Control section

What is claimed is:
1. A terminal, comprising:
a reception section that receives second control information from a base station in a Physical Downlink Control Channel (PDCCH) related to a sidelink (SL) configured for a cell in a specific Physical Uplink Control Channel (PUCCH) group, the second control information indi- cating a channel for transmitting first control informa-
tion and data to another terminal in inter-terminal
communication; and a transmission section that transmits a second response
signal to the base station with a PUCCH configured for
a specific cell in the specific PUCCH group, the second
response signal being based on a first response signal
transmitted by the other terminal having received the
data, wherein:

the reception section receives a first higher layer param-
eter and a second higher layer parameter that are related
to the SL, the first higher layer parameter including first
configuration information, the second higher layer
parameter including the second configuration informa-
tion, the first configuration information indicates a resource in
which the PDCCH is configured, and the second configuration information indicates a resource
in which the PUCCH is configured.

2. The terminal according to claim 1, wherein the specific
cell in the specific PUCCH group is a PUCCH-Secondary
Cell (SCell).

3. A communication system, comprising:

a base station;

a first terminal that communicates with the base station;
and a second terminal that performs inter-terminal communi-
cation with the first terminal, wherein the first terminal includes:

a reception section that receives second control infor-
mation from the base station in a Physical Downlink
Control Channel (PDCCH) related to a sidelink (SL)
configured for a cell in a specific Physical Uplink
Control Channel (PUCCH) group, the second control
information indicating a channel for transmitting
first control information and data to the second
terminal; and a transmission section that transmits a second response
signal to the base station with a PUCCH configured for a specific cell in the specific PUCCH group, the
second response signal being based on a first
response signal transmitted by the second terminal
having received the data, wherein:

the reception section receives a first higher layer param-
eter and a second higher layer parameter that are related
to the SL, the first higher layer parameter including first
configuration information, the second higher layer
parameter including the second configuration informa-
tion, the first configuration information indicates a resource in
which the PDCCH is configured, and the second configuration information indicates a resource
in which the PUCCH is configured.

4. A communication method performed by a terminal, the
communication method comprising:

receiving second control information from a base station
in a Physical Downlink Control Channel (PDCCH)
related to a sidelink (SL) configured for a cell in a
specific Physical Uplink Control Channel (PUCCH)
group, the second control information indicating a
channel for transmitting first control information and
data to another terminal in inter-terminal communica-
tion;

transmitting a second response signal to the base station
with a PUCCH configured for a specific cell in the
specific PUCCH group, the second response signal
being based on a first response signal transmitted by the
other terminal having received the data; and receiving a first higher layer parameter and a second
higher layer parameter that are related to the SL, the
first higher layer parameter including first configuration
information, the second higher layer parameter includ-
ing the second configuration information, wherein the first configuration information indicates a
resource in which the PDCCH is configured, and wherein the second configuration information indicates a
resource in which the PUCCH is configured.

* * * * *